United States Patent Office 3,649,649
Patented Mar. 14, 1972

3,649,649
FLUORAN DERIVATIVES AND PREPARATION THEREOF
Michio Orita and Masakichi Yahagi, Tokyo, Chohji Enomoto and Takeo Obitu, Saitama-ken, and Takafumi Tohyama, Tokyo, Japan, assignors to Nisso Kako Co., Ltd.
No Drawing. Filed July 2, 1968, Ser. No. 741,871
Claims priority, application Japan, July 10, 1967, 42/44,026; Mar. 23, 1968, 43/18,545
Int. Cl. C07d 5/34
U.S. Cl. 260—343.3    4 Claims

ABSTRACT OF THE DISCLOSURE

Compounds of the formula

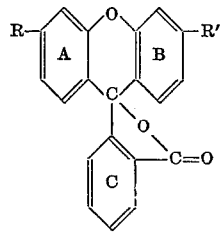

wherein R is alicyclic amino, morpholino or piperidino, and R' is hydrogen, chlorine or lower alkyl are disclosed. These compounds may be incorporated within color coating compositions.

---

This invention relates to a colour-developable coating composition characterized by containing a fluoran derivative of the general formula

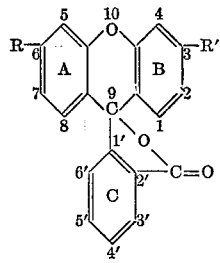

in which R is an alicyclic amino, heterocyclic amino or monoalkylamino group; R' is hydrogen, chlorine or a lower alkyl group and when R is a monoalkylamino group R' is other than chlorine; the benzene rings A and B may further be substituted with a lower alkyl or halogen and the benzene ring C may be substituted with a halogen atom.

The fluoran derivatives of the above general Formula I are new compounds which have never been disclosed in any prior art literature. They are nearly colourless or slightly coloured crystal. When the above derivatives are brought into contact with an electron-accepting substance, e.g., active clay or acid clay, they can show clear colour. Such colour formation of the fluoran derivatives may occur where the fluorans in crystalline form are brought into contact with an acid in vapor or solution phase, or where the fluorans dissolved in an organic solvent such as benzene, toluene, chlorinated biphenyl or the like are brought into contact with an electron-accepting adsorbent substance such as clay. This characteristic of the fluoran derivatives makes it possible to use them as colour-forming component in the so-called pressure-sensitive duplicating media. For example, a fluoran compound of the general formula in admixture with a wax is coated on a suitable support (e.g. paper, cloth, plastic film, etc.). Alternatively, the fluoran compound dissolved in chlorinated biphenyl is encapsuled with a coating including gelatine and/or gum arabic and/or carboxymethyl cellulose to have individually separate fine particles (so-called microcapsules), which are then carried on a support. The coated surface is placed in contact with the surface of another sheet, on which white clay or the like electron-accepting adsorbent substance has been coated. To the assembly, localized pressure is applied. In the former type of duplicating medium, the fluoran compound which exudates from the wax layer contacts with white clay. In the latter type of duplicating medium, the solution of the fluoran compound which is flown out of a destroyed capsule contacts with white clay. Clear colour is developed thereby on the clay-coated surface. Coating materials which encapsule the fluoran solution include, besides said gelatine, gum arabic, carboxymethyl cellulose, natural or synthetic high molecular substances, e.g., casein, tragacanth gum, methyl cellulose, ethyl cellulose, hydroxyethyl cellulose, starch, sodium alginate, ureaformalin resin and the like. Solvents which dissolve a fluoran derivative include, in addition to said chlorinated biphenyl, for example, chlorinated paraffin and various paraffins, spindle oil, turpentine oil, dibutyl phthalate, dioctyl phthalate, olive oil, cotton seed oil, peanut oil, castor oil and the like.

Alternatively, where the fluoran derivative is coated on a support by using as a binder, for example, starch paste and the coated surface is brought into contact with an acid of a proper concentration, colour is developed on the portion of contact. A fluoran derivative of the above general Formula I does not cause any colour-development on being encapsuled and a nearly colourless capsule is easily obtainable. Such a fluoran derivative is suitable as a colour-forming component in the preparation of capsules.

As colour-forming component, individual fluoran derivative of the general Formula I is of course useful, but joint use of several kinds of these colour-forming components or another series of colour-forming components (e.g., Crystal Violet Lactone or Benzoyl Leucomethylene Blue, etc.) or a UV-absorbent makes it possible to produce a composition having different colour tone, fastness, colour-developability and the like.

The fluoran derivatives of the general Formula I are prepared by heating to melt one mole ratio of a fluoran compound of the general formula

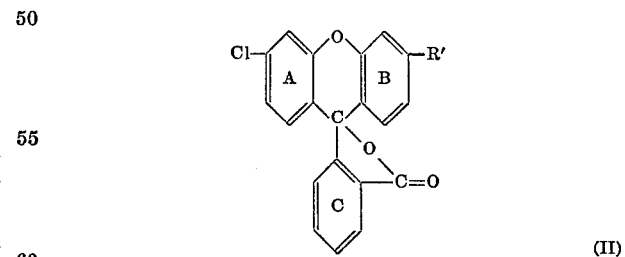

(wherein R' and the benzene rings A, B and C are as aforementioned) or its corresponding derivative together with one mole ratio of a monoalkylamine, alicyclic amine or heterocyclic amine or its salt for several hours in the presence of anhydrous zinc chloride or aluminum chloride. In this case, addition of zinc oxide to the reaction system facilitates progress of the reaction. Examples of monoalkylamines are methylamine, ethylamine, propylamine (n- or isopropylamine), butylamine (n- or tert. butylamine), etc. Examples of alicyclic amines are cyclohexylamine, N-methyl cyclohexylamine, dicyclohexylamine, etc. Examples of heterocyclic amines are pyrrolidine, piperidine, pipecoline, morpholine, thiomorpholine, etc.

Preparation of the fluoran derivatives of the general Formula II comprises condensation of a 2-hydroxy-4-R'-2'-carboxybenzophenone of the Formula III and a m-chlorophenol of the Formula IV;

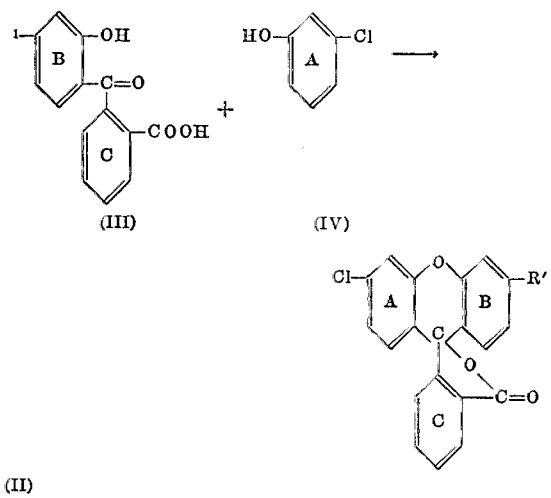

condensation of a m-R'-substituted phenol of the Formula V and a 2-hydroxy-4-chloro-2'-carboxybenzophenone of the Formula VI;

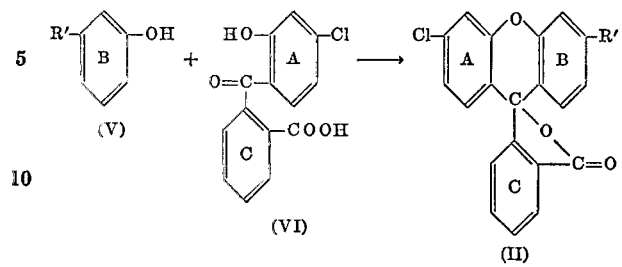

(these condensation reactions can be facilitated by using sulfuric acid or zinc chloride as the condensing agent) or chlorination of a fluoran derivative of the formula

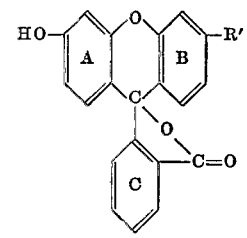

with, for example, phosphorus pentachloride (in the above formulae, R' and benzene rings A, B and C are as aforementioned).

Colour developed on a clay-coated paper with some of the fluoran derivatives of the general Formula I having indicated melting points are shown in the Table 1.

TABLE 1.—ANOTHER SUBSTITUENT ON BENZENE RING

| R | R' | A | B | C | Melting point (° C.) | Colour [1] |
|---|---|---|---|---|---|---|
| ⟨H⟩—NH— | Cl |  |  |  | 178–181 | Orange. |
| Same as above | Cl | 5-CH₃ | 4-CH₃ |  | 226–227 | Vermilion. |
| Do | Cl |  |  | 3',4',5',6'-tetrachloro | 242–243 | Red. |
| H₂C(CH₂—CH₂)₂N— | Cl |  |  |  | 175–176 | Red. |
| Same as above | Cl |  |  | 3',6'-dichloro | 212–214 | Red-violet. |
| Do | Cl |  |  | 3',4',5',6'-tetrachloro | 243–246 | Do. |
| O(CH₂—CH₂)₂N— | Cl |  |  | 3',6'-dichloro | 245–247 | Do. |
| Same as above | Cl |  |  | 3',4',5',6'-tetrachloro | 183–185 | Do. |
| ⟨H⟩—NH— | H |  | 2-Cl |  | 207–209 | Orange. |
| CH₃NH— | H |  | 2-Cl |  | 213–215 | Do. |
| ⟨H⟩(⟨H⟩)N— | H |  | 2-Cl |  | 199–201 | Do. |
| ⟨H⟩—NH— | H | 5-CH₃ | 2-Br |  | 235–137 | Do. |
| CH₃CH₂NH— | H |  | 2-Br |  | 158–160 | Do. |
| ⟨H⟩—NH— | H |  | 2-CH₃ |  | 137–140 | Do. |
| CH₃NH— | H |  | 2-CH₃ |  | 217–219 | Do. |
| (CH₃)₂CHNH— | H |  | 2-CH₃ |  | 169–171 | Do. |

3,649,649

TABLE 1.—ANOTHER SUBSTITUENT ON BENZENE RING—Continued

| R | R' | A | B | C | Melting point (° C.) | Colour [1] |
|---|---|---|---|---|---|---|
| H₂C(CH₂—CH₂)₂N— | H | | {2-Cl, 4-Cl} | | 177–179 | Red. |
| ⟨H⟩—NH— | H | 7-Cl | 2-Cl | | 197–200 | Orange. |
| O(CH₂—CH₂)₂N— | H | 5-CH₃ | 2-CH₃ | | 203–205 | Red. |
| H₂C(CH₂—CH₂)₂N— | CH₃ | | | | 108–110 | Red. |
| ⟨H⟩—N(CH₃)— | CH₃ | | | | 169–171 | Orange. |
| CH₃(CH₂)₃NH— | CH₃ | 7-Cl | 2-Cl | | 187–189 | Do. |
| ⟨H⟩—NH— | HC₃ | | {1-CH₃, 2-Cl} | | 186–188 | Do. |

[1] Colour was developed on the clay-coated paper by immersing said paper in 0.1% toluene solution of a fluoran derivative and thereafter drying the paper.

EXAMPLE 1

2.5 g. of 3-chloro-6-cyclohexylamino-fluoran of the formula

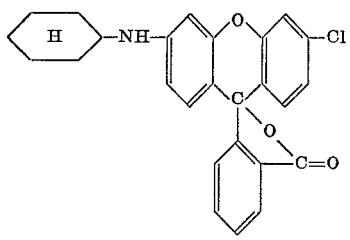

are dissolved in 40 g. of trichlorinated biphenyl by heating at 100° C. (resulting solution is referred to as solution A). On the other hand, 2.5 g. of CMC (carboxymethyl cellulose) are slowly added to 100 g. of water to give a complete solution (resulting solution is referred to as solution B). The solutions A and B are mixed together at 50°–60° C. and stirred at high speed to effect emulsification. A solution of 5.0 g. of gelatine having isoelectric point of 8.0 in 50 g. of water is added to the mixture and agitation at high speed is continued for one hour at 50°–60° C. The mixture is then cooled to 5°–10° C. and 10 g. of 37% Formalin are added. Agitation at high speed is continued for further one hour at 10°–20° C. Then, pH value is adjusted to 9.0 with 5% aqueous caustic soda solution. After allowing to stand for several hours, an emulsion comprising very fine capsules coated by CMC-gelatine gel is obtained. Said capsules contain the solution of 3-chloro-6-cyclohexylamino-fluoran in trichlorinated biphenyl. The resulting emulsion is coated on a paper and then dried. The coated surface of this paper is brought into contact with a clay-coated surface of another paper. When letters or figures are impressed onto the emulsion-coated paper, clear red copy is obtained on the clay-coated paper.

3-chloro-6-cyclohexylamino-fluoran used herein before can be prepared as follows:

A mixture comprising 10.0 g. of 3,6-dichloro-fluoran, 6.0 g. of cyclohexylamine hydrochloride, 10.0 g. of anhydrous zinc chloride and 4.0 g. of zinc oxide is heated to melt at 190°–200° C. for 4 hours. The mixture is then cooled and the resulting solid is ground and heated under stirring together with a solution of 10 cc. of concd. hydrochloric acid in 300 cc. of water. Zinc chloride solution is filtered. The residue is boiled together with a solution of 10.0 g. of anhydrous sodium carbonate in 300 cc. of water, filtered, washed with water and dried. The dried material is boiled under reflux for one hour together with 400 cc. of toluene and activated charcoal is added thereto. After the hot filtration, the filtrate is washed with a diluted aqueous solution of sodium carbonate until the aqueous layer becomes colourless and at last with water. Toluene is distilled off under reduced pressure. Just before the beginning of precipitation of crystal, distillation is stopped and 60 cc. of methanol is added to the solution while it is hot. The stirred solution is then allowed to stand overnight to precipitate colourless crystal. This colourless crystal is filtered, washed with methanol and dried to give 7.0 g. of 3-chloro-6-cyclohexylamino-fluoran as colourless crystal melting at 178°–181° C.

EXAMPLE 2

5.0 g. of 3-chloro-6-morpholino-fluoran of the formula

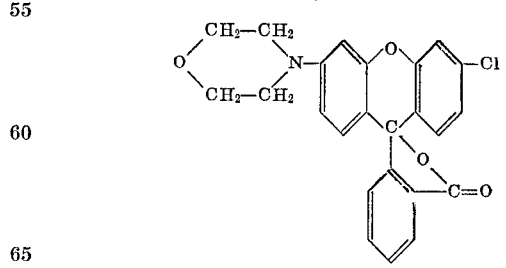

are dissolved in a mixture comprising 100 g. of carnauba wax, 50 g. of dibutyl phthalate and 1.0 g. of a surfactant (polyethylene glycol octaylphenyl ether) at 80°–90° C. The resulting solution is coated on a paper. The coated surface of this paper is brought into contact with a clay-coated surface of another paper. When letters or figures are impressed onto the paper coated with the above solution, clear deep red copy is obtained on the clay-coated paper.

3-chloro-6-morpholino-fluoran used hereinbefore is prepared by heating to melt a mixture comprising 10.0 g. of 3,6-dichlorofluoran, 2.6 g. of morpholine, 3.1 g. of concd. hydrochloric acid, 10.0 g. of anhydrous zinc chloride and 4.0 g. of zinc oxide at 190°–200° C. for 4 hours and treating the reaction mixture in a manner similar to that in Example 1. 5.0 g. of 3-chloro-6-morpholinofluoran melting at 143°–148° C. are obtained as pinkish crystal.

EXAMPLE 3

Use of 3,3',4',5',6' - pentachloro - 6 - cyclohexylaminofluoran of the formula

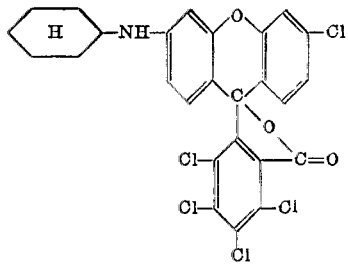

in a manner similar to that in Example 1 or 2 provides clear orange-red copy on a clay-coated paper.

The above fluoran derivative is prepared by heating to melt a mixture comprising 10.0 g. of 3,3',4',5',6,6'-hexachlorofluoran, 4.0 g. of cyclohexylamine hydrochloride, 12 g. of anhydrous zinc chloride and 4.0 g. of zinc oxide at 200°–210° C. for 4 hours and treating the reaction mixture in a manner similar to that in Example 1. 4.0 g. of 3,3',4',5',6'-pentachloro-6-cyclohexylamino-fluoran melting at 242°–243° C. are thus obtained as nearly colourless crystal.

EXAMPLE 4

Use of 3-chloro-6-piperidino-fluoran of the formula

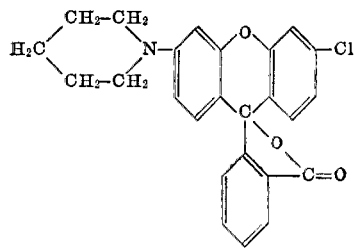

in a manner similar to that in Example 1 or 2 provides clear red copy on a clay-coated paper.

The above fluoran derivative is prepared by heating to melt the mixture as used in the Example 1 with the exception that 4.5 g. of piperidine hydrochloride are used in place of cyclohexylamine hydrochloride in Example 1 for 4 hours at 200°–210° C. and treating thereafter in the similar manner as in Example 1. The fluoran derivative is obtained as colourless crystal melting 175°–176° C. (yield 5.0 g.).

EXAMPLE 5

Use of 3-chloro-4,5-dimethyl-6-cyclohexylaminofluoran of the formula

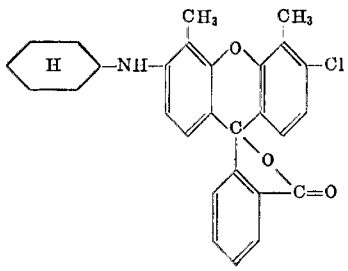

in a manner similar to that in Example 1 or 2 provides clear vermilion copy on a clay-coated paper.

The above fluoran derivative is obtained as nearly colourless crystal melting 226°–227° C. by carrying out the reaction and the subsequent after treatment in the similar manner as Example 1 with the exception that 3,6-dichloro-4,5-dimethyl-fluoran is used in place of 3,6-dichloro-fluoran.

EXAMPLE 6

2.5 g. of 2-methyl-6-isopropylamino-fluoran of the formula

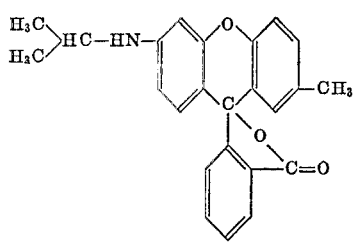

are dissolved in 40 g. of trichlorinated biphenyl by heating at 100° C. (resulting solution is referred to as solution A). On the other hand, 1 g. of CMC and 5 g. of gum arabic are slowly added to 70 cc. of water and the resulting solution in which CMC and gum arabic are completely dissolved is adjusted to pH 9.0 with a diluted alkali solution (resulting solution is referred to as solution B). The solutions A and B are mixed together at 50°–60° C. and stirred at high speed to effect emulsification. To the resulting emulsion is added a solution of 3.0 g. of gelatine in 30 cc. of water and stirring at high speed is continued at 50°–60° C. for minutes. After addition of 100 cc. of water over 30 minutes, the pH value of about 9.0 of the emulsion is reduced with 10% acetic acid solution to 3.8 over about one hour and then the emulsion is cooled in ice bath. After about 30 minutes, the emulsion is cooled to 10°–7° C. 3 g. of 37% Formalin are immediately added to the cooled emulsion, which is adjusted to pH 10 with 10% caustic soda solution. After continuing high speed agitation at 10°–20° C., 3 g. of CMC are added and high speed agitation is continued for further several minutes.

Thus, the emulsion containing very fine capsules in which the solution of 2-methyl-6-isopropylamino-fluoran in trichlorinated biphenyl is encapsuled is obtained. This emulsion is treated in the same manner as in Example 1 to give clear orange copy on a clay-coated paper.

2-methyl-6-isopropylamino-fluoran used is prepared as follows:

A mixture comprising 10.0 g. of 2-methyl-6-chlorofluoran (M.P. 221°–223° C.), 4.0 g. of isopropylamine hydrochloride, 10.0 g. of anhydrous zinc chloride and 4.0 g. of zinc oxide is heated to melt for 4 hours at 190°–200° C. After cooling, the resulting solid substance is ground and heated together with a solution of 10 cc. of concd. hydrochloric acid in 300 cc. of water while stirring. Zinc chloride solution is filtered. The residue is washed with a diluted alkali solution and dried. The dried substance is boiled under reflux for one hour together with 400 cc. of toluene and activated charcoal is added and hot filtration is carried out. After cooling, the filtrate is washed with a diluted alkali solution until the aqueous layer becomes colourless and distilled under reduced pressure to eliminate toluene. The residue is dissolved in 60 cc. of methanol by heating and the resulting solution is allowed to cool overnight to precipitate pale yellow crystal. This crystal is filtered, washed with cold methanol and dried to give 5.5 g. of 2-methyl-6-isopropylamino-fluoran as colourless crystal melting at 169°–171° C.

EXAMPLE 7

5.0 g. of 2-bromo-6-cyclohexylamino-fluoran of the formula

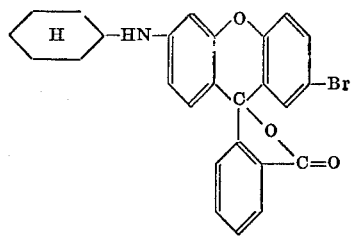

are dissolved in a mixture comprising 100 g. of carnauba wax, 50 g. of dibutyl phthalate and 1.0 g. of a surfactant (polyethylene glycol octylphenyl ether) as 80°–90° C. The resulting solution gives on a clay-coated paper clear orange copy when the same treatment as in Example 1 is carried out.

2-bromo-6-cyclohexylamino-fluoran used as prepared by heating to melt a mixture comprising 10.0 g. of 2-bromo-6-chlorofluoran (M.P. 178°–180° C.), 5.0 g. of cyclohexylamine hydrochloride, 10.0 g. of anhydrous zinc chloride and 4.0 g. of zinc oxide at 200°–210° C. for 4 hours and effecting thereafter the reactions defined in Example 1 in the same manner. 6.5 g. of the above fluoran derivative are obtained as colourless crystal melting at 235°–237° C.

EXAMPLE 8

Use of 2,4-dichloro-6-piperidino-fluoran of the formula

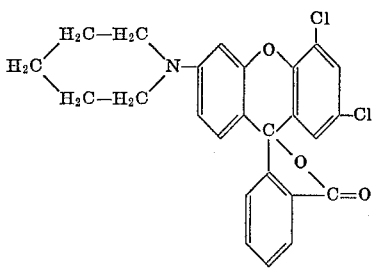

in a manner similar to that in Example 6 or 7 provides on a clay-coated paper clear red copy.

The above fluoran derivative is prepared as follows: A mixture comprising 10.0 g. of 2,4,6-trichlorofluoran (M.P. 193°–195° C.), 4.0 g. of piperidine hydrochloride, 10.0 g. of anhydrous zinc chloride and 4.0 g. of zinc oxide is heated to melt at 200°–210° C. until the melt changes to a solid mass (it takes about one hour). This solid mass is treated thereafter in the similar manner as in Example 6 to give 5.8 g. of 2,4-dichloro-6-piperidino-fluoran melting at 177°–179° C. as nearly colourless crystal.

EXAMPLE 9

Use of 2,5-dimethyl-6-morpholino-fluoran of the formula

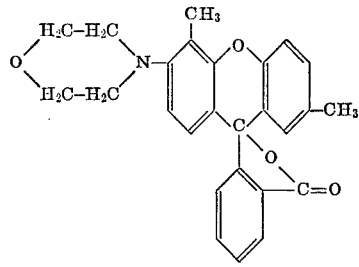

in a manner similar to that in Example 6 or 7 provides on a clay-coated paper red copy.

The above fluoran derivative is prepared as follows: A mixture comprising 10.0 g. of 2,5-dimethyl-6-chlorofluoran (M.P. 217°–219° C.), 5.1 g. of morpholine hydrochloride, 10.0 g. of anhydrous zinc chloride and 4.0 g. of zinc oxide is heated to melt at 200°–210° C. for 4 hours and treated thereafter in the similar manner as in Example 6 to give 4.6 g. of 2,5-dimethyl-6-morpholino-fluoran as nearly colourless crystal melting at 203–205° C.

EXAMPLE 10

Use of 2,7-dichloro-3-methyl-6-n-butylamino-fluoran of the formula

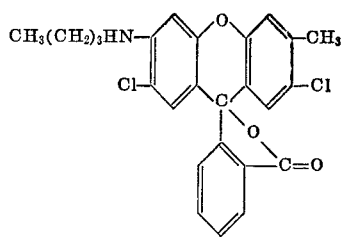

in a manner similar to that in Example 6 or 7 porvides on a clay-coated paper orange copy.

The above fluoran derivative is prepared as follows: A mixture comprising 10.0 g. of 2,6,7-trichloro-3-methyl-fluoran (M.P. 234°–236° C.), 3.9 g. of n-butylamine hydrochloride, 10.0 g. of anhydrous zinc chloride and 4.0 g. of zinc oxide is heated to melt at 200°–210° C. for 4 hours and treated thereafter in the similar manner as in Example 6 to give 5.0 g. of 2,7-dichloro-3-methyl-6-n-butylamino-fluoran as nearly colourless crystal melting at 187°–190° C.

EXAMPLE 11

Use of a mixture comprising 1.0 g. of 2-methyl-6-isopropylamino-fluoran (M.P. 169–171° C.), 2.0 g. of Crystal Violet Lactone and 2.0 g. of leuco benzoyl Methylene Blue in a manner similar to that in Example 6 provides on a clay-coated paper clear black copy.

What we claim is:
1. A compound of the formula

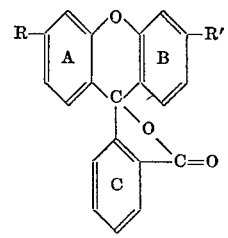

wherein R is selected from the group consisting of cyclohexylamino, dicyclohexylamino, N-methyl cyclohexylamino, morpholino and piperidino, and R' is hydrogen, chlorine or methyl, wherein benzene ring A, B, or A and B are optionally substituted with a substituent selected from the group consisting of methyl and halogen and benzene ring C is optionally substituted with halogen.

2. A compound of the formula

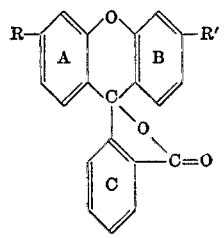

wherein R is selected from the group consisting of cyclohexylamino, dicyclohexylamino and N-methylcyclohexylamino, and R' is hydrogen, chlorine or methyl wherein benzene rings A, B or A and B are optionally substituted with a substituent selected from the group consisting of methyl and halogen and benzene ring C is substituted with halogen.

3. The compound as claimed in claim 1 wherein R is cyclohexylamino and R' is chlorine.

4. The compound as claimed in claim 2 wherein R is cyclohexylamino and R' is chlorine.

References Cited
UNITED STATES PATENTS 3,244,728   4/1966   Johnson et al. _____ 117—36.2
3,514,311   5/1970   Katayama et al. ____ 117—36.2

ALEX MAZEL, Primary Examiner
A. M. T. TIGHE, Assistant Examiner

U.S. Cl. X.R.
117—36.2; 252—316; 260—243 B, 247.2 B, 293.58, 326.3